W. EICHELKRAUT.
PORTABLE AND COLLAPSIBLE STAND FOR SPIRIT STOVES.
APPLICATION FILED MAY 31, 1912.
1,050,113.
Patented Jan. 14, 1913.
2 SHEETS—SHEET 2.
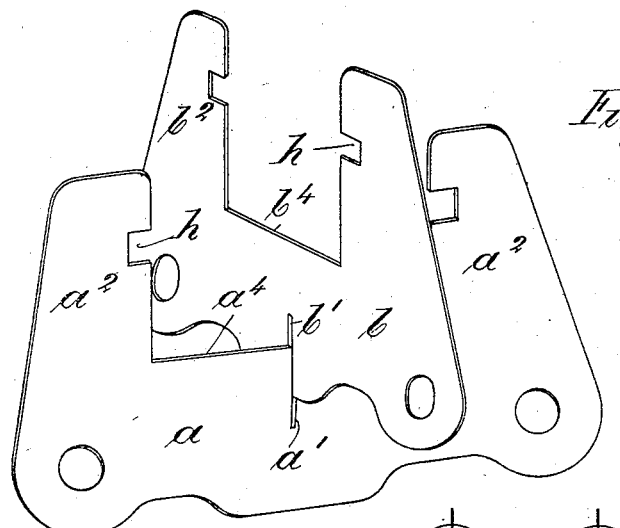
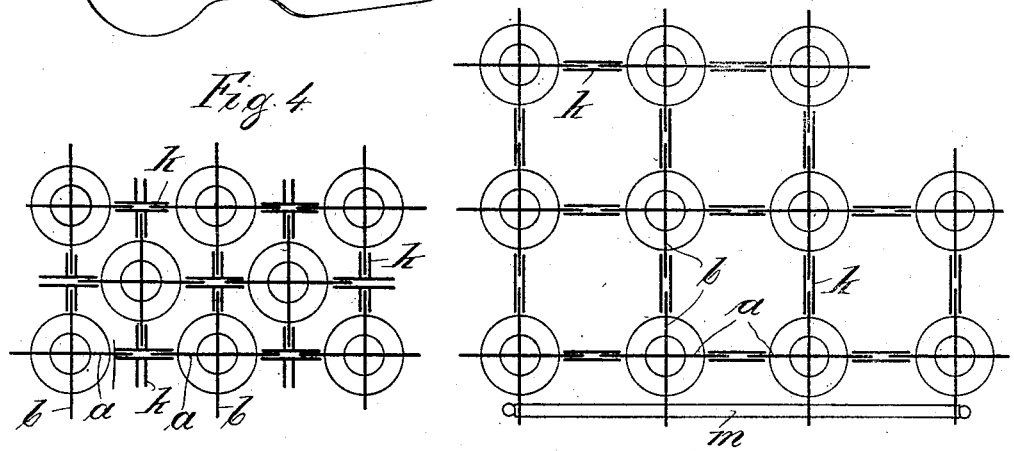
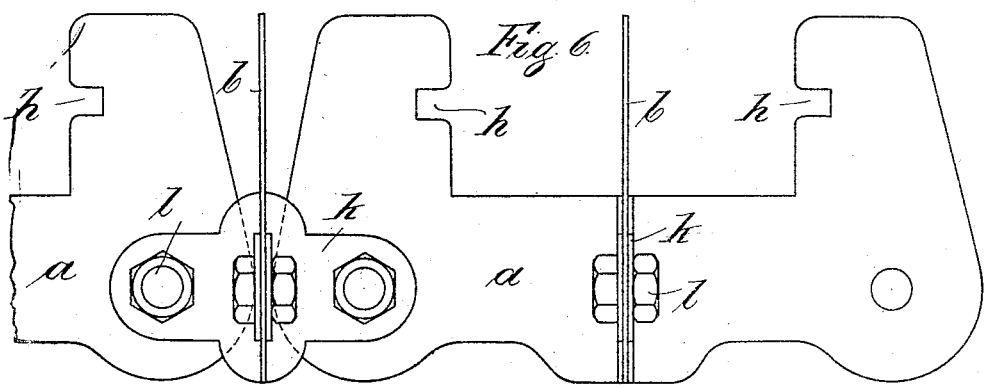
Witnesses:
L. H. Cadart.
C. D. Brown.
Inventor:
Walter Eichelkraut
by Foster, Freeman,
Watson & Coit,
Attorneys.

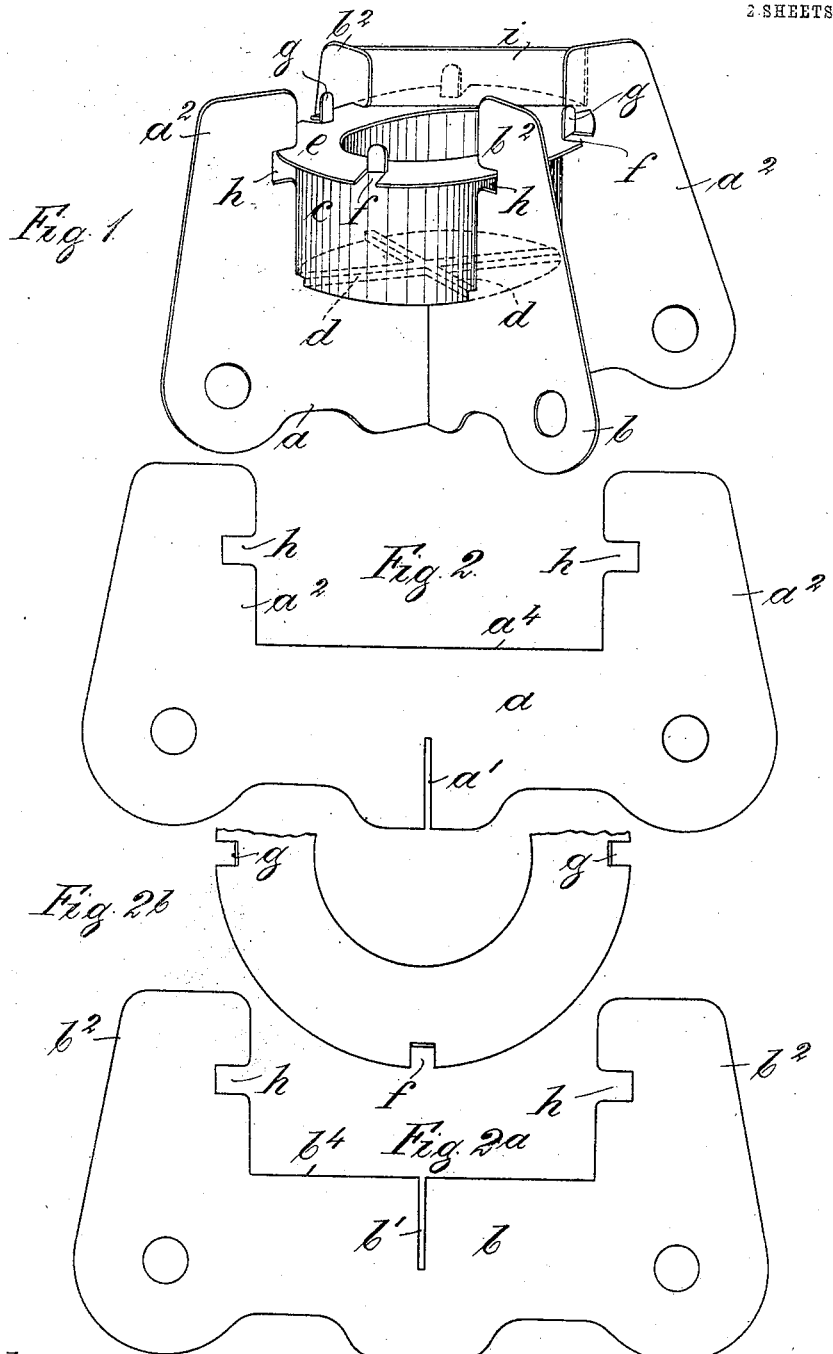

UNITED STATES PATENT OFFICE.

WALTER EICHELKRAUT, OF ZEHLENDORF, NEAR BERLIN, GERMANY.

PORTABLE AND COLLAPSIBLE STAND FOR SPIRIT-STOVES.

1,050,113.  Specification of Letters Patent.  Patented Jan. 14, 1913.

Application filed May 31, 1912. Serial No. 700,890.

*To all whom it may concern:*

Be it known that I, WALTER EICHELKRAUT, a subject of the King of Prussia, and resident of 6/8 Seehofstrasse, Zehlendorf, near Berlin, Germany, architect, have invented certain new and useful Improvements in Portable and Collapsible Stands for Spirit-Stoves.

This invention relates to an improved portable and collapsible stand adapted to receive a spirit reservoir lamp or stove and to support a cooking utensil above the lamp, and of the type in which the stand comprises a plurality of substantially U-shaped members arranged to intersect one another.

According to the present invention the U-shaped members are retained in their proper position relatively to one another by means of grooves or the like provided in the underside of the reservoir or of the lamp, these grooves fitting over the edges of the U-shaped members. The reservoir or lamp is held in position by means of a notched ring which is capable of being fitted over the U-shaped members so as to fit within notches in the upwardly projecting arms or webs of the U-shaped members. By this means the U-shaped members and the reservoir or lamp are firmly secured together so that the whole may be transported without danger.

In order that the invention may be more clearly understood, reference is made to the accompanying drawings, which show by way of example the preferred method of carrying out my invention.

Figure 1 is a perspective view of the stand and reservoir in position ready for use. Figs. 2 and 2ª are detail side views of the U-shaped members and Fig. 2ᵇ is a plan view of the ring. Fig. 3 is a perspective view showing the fitting together of the two U-shaped members. Figs. 4 and 5 are plan-views showing two different methods of securing a plurality of stands together and Fig. 6 is a detail view elevation showing the setting together of the stands in the manner illustrated in Fig. 4.

Referring to Figs. 1 to 3, the stand comprises two U-shaped members $a$ and $b$ the member $a$ having upwardly projecting parts $a^2$ and being provided in its lower transverse part with a slot $a'$ which is downwardly directed, while the member $b$ has projecting parts $b^2$ and is provided with a similar but upwardly directed slot $b'$ so that the members $a$ and $b$ can be fitted together so as to intersect one another, as illustrated in Figs. 1 and 3. It will thus be seen that when the members $a$ and $b$ are fitted together, a space is formed between the upwardly projecting parts $a^2$ and $b^2$ for the reception of the spirit reservoir $c$ which is provided on its lower side with transverse grooves or the like $d$ adapted to fit over the edges $a^4$ and $b^4$ of the members $a$ and $b$ respectively, the reservoir $c$ thus insuring the proper relative position of the members $a$ and $b$. The reservoir $c$ is held in position by means of a ring $e$ which is provided with notches $f$ formed by stamping out and upwardly turning a plurality of lugs $g$. The ring $e$ is fitted in position by passing the slots $f$ over the upwardly projecting parts $a^2$ and $b^2$, the lugs $g$ at the same time serving to center the ring. The ring $e$ is also adapted to retain the members $a$ and $b$ in their proper position by engaging in notches $h$ in the parts $a^2$ and $b^2$ on slightly rotating the ring $e$. It will be seen that the weight and pressure of the ring $e$ upon the reservoir $c$ is transmitted to the members $a$ and $b$ so that the stand may be readily transported without danger on raising the same by means of either the member $a$ or the member $b$. It will be readily seen that in order to take the stand to pieces it is only necessary to rotate the ring $e$ until the notches $f$ register with the upwardly projecting parts $a^2$ and $b^2$ and then to raise the same and remove the reservoir $c$ whereupon the members $a$ and $b$ may be readily taken apart.

Figs. 4 and 6 show one method of securing a plurality of stands together, the members $a$ or $b$ respectively of adjoining stands being connected together by means of fish-plates $k$ and bolts or other suitable fastenings $l$. As shown in Fig. 5 the stands may also be connected together by means of a longitudinal or transverse detachable rod $m$. In order to prevent the flame from the spirit reservoir from being extinguished the ring $e$ may as shown in Fig. 1 be provided with an upwardly projecting wind-guard $i$.

I claim:—

1. In combination with a spirit reservoir, a portable and collapsible stand comprising, in combination, a plurality of interlocking members each having a pair of upwardly projecting shanks notched in their inner edges, said reservoir fitting between said shanks and having grooves in its bottom fitting over the upper edges of said members, and a notched ring capable of being fitted between said shanks and over said reservoir and which, when turned, engages in the notches of said shanks.

2. In combination with a spirit reservoir, a portable and collapsible stand comprising, in combination, a plurality of interlocking members each having a pair of upwardly projecting shanks notched on their inner edges, said reservoir fitting between said shanks and having grooves in its bottom fitting over the upper edges of said members, a notched ring capable of being fitted between said shanks and over said reservoir and which when turned, engages in the notches of said shanks, and a wind-guard projecting upwardly from said ring.

In witness whereof I have hereunto set my hand in the presence of two witnesses.

WALTER EICHELKRAUT.

Witnesses:
 HENRY HASPER,
 WOLDEMAR HAUPT.